(12) United States Patent
Scheim et al.

(10) Patent No.: US 8,217,113 B2
(45) Date of Patent: Jul. 10, 2012

(54) CROSSLINKABLE COMPOSITIONS BASED ON ORGANOSILICON COMPOUNDS

(75) Inventors: Uwe Scheim, Coswig (DE); Wolfram Schindler, Tuessling (DE); Peter Schoeley, Diera-Zehren (DE); Volker Stanjek, Ampfing (DE)

(73) Assignee: Wacker Chemie AG, Munich (DE)

(*) Notice: Subject to any disclaimer, the term of this patent is extended or adjusted under 35 U.S.C. 154(b) by 260 days.

(21) Appl. No.: 12/671,603

(22) PCT Filed: Jul. 29, 2008

(86) PCT No.: PCT/EP2008/059928
§ 371 (c)(1),
(2), (4) Date: Feb. 1, 2010

(87) PCT Pub. No.: WO2009/019165
PCT Pub. Date: Feb. 12, 2009

(65) Prior Publication Data
US 2011/0224366 A1 Sep. 15, 2011

(30) Foreign Application Priority Data
Aug. 7, 2007 (DE) .......... 10 2007 037 197

(51) Int. Cl.
C08L 83/08 (2006.01)
C07F 7/18 (2006.01)
C08G 77/26 (2006.01)
(52) U.S. Cl. ............ 524/588; 544/69; 528/38
(58) Field of Classification Search .......... 524/588; 544/69; 528/38
See application file for complete search history.

(56) References Cited

U.S. PATENT DOCUMENTS

| | | | | |
|---|---|---|---|---|
| 3,764,597 A * | 10/1973 | Barcza | ............ | 544/69 |
| 4,461,867 A * | 7/1984 | Surprenant | ............ | 524/788 |
| 4,980,396 A * | 12/1990 | Yoshida | ............ | 523/212 |
| 5,093,454 A * | 3/1992 | Fujimoto et al. | ............ | 528/34 |
| 5,380,846 A * | 1/1995 | Stein | ............ | 546/14 |
| 5,674,936 A * | 10/1997 | Lucas | ............ | 524/731 |
| 6,001,948 A | 12/1999 | Scheim et al. | | |
| 6,235,832 B1 * | 5/2001 | Deng et al. | ............ | 524/525 |
| 6,413,446 B1 * | 7/2002 | Mechtel et al. | ............ | 252/181 |
| 2004/0181025 A1 * | 9/2004 | Schindler et al. | ............ | 528/38 |
| 2005/0272895 A1 * | 12/2005 | Ziche et al. | ............ | 528/30 |
| 2007/0232729 A1 | 10/2007 | Briehn et al. | | |
| 2008/0064813 A1 * | 3/2008 | Schneider | ............ | 524/837 |
| 2009/0012322 A1 * | 1/2009 | Bockholt et al. | ............ | 556/421 |

FOREIGN PATENT DOCUMENTS

| | | |
|---|---|---|
| CN | 1202506 A | 12/1998 |
| CN | 1950458 A | 4/2007 |
| DE | 19725501 C1 | 12/1998 |
| DE | 10146395 B4 | 9/2005 |
| EP | 0885931 A2 | 12/1998 |
| KR | 1999-007007 A | 1/1999 |
| WO | 2005108495 A2 | 11/2005 |
| WO | WO 2006119916 A1 * | 11/2006 |

\* cited by examiner

*Primary Examiner* — Robert Loewe
(74) *Attorney, Agent, or Firm* — Brooks Kushman P.C.

(57) ABSTRACT

Condensation crosslinkable compositions based on organosilicon compounds contain at least one heterocyclic compound $A[CR^1_2SiR_a(OR^2)_{3-a}]_x$ which contains at least one heteroatom from main groups 3 or 5 and is bonded to $CR^1_2$ through one of these heteroatoms.

10 Claims, No Drawings

CROSSLINKABLE COMPOSITIONS BASED ON ORGANOSILICON COMPOUNDS

CROSS-REFERENCE TO RELATED APPLICATION

This application is the U.S. national phase of PCT Appln. No. PCT/EP2008/059928 filed Jul. 29, 2008 which claims priority to German application DE 10 2007 037 197.9 filed Aug. 7, 2007.

BACKGROUND OF THE INVENTION

1. Field of the Invention

The invention relates to crosslinkable materials based on organosilicon compounds which contain heterocyclic compounds, to processes for the preparation thereof and to the use thereof.

2. Description of the Related Art

One-component sealing compounds (RTV-1) storable in the absence of water and which vulcanize to produce elastomers on admission of water at room temperature have long been known. These products are used in large amounts, for example, in the construction industry, and are based on polymers which are terminated by silyl groups which carry reactive substituents such as OH groups, or hydrolyzable groups such as, for example, alkoxy groups. Furthermore, these sealing compounds may contain fillers, plasticizers, crosslinking agents, catalysts and additives.

DE 197 25 501 C1 describes alkoxy-crosslinking RTV1 silicone rubber mixtures which, in addition to hydroxyl-terminated polydiorganosiloxane, contain alkoxysilanes substituted by heterocycles, such as, for example, N-1-(triethoxysilyl)ethylsuccinimide or N-[1-(triethoxysilyl)ethyl]-2-pyrrolidone. It is true that, with the use of these compounds, it is readily possible to prepare materials whose reactivity toward conventional materials is increased to such an extent that it is even possible to use ethoxy-substituted compounds. However, they are still so slow that the use of catalysts is required for the reaction of the silane with the hydroxyl-terminated polydiorganosiloxane and that large amounts of crosslinking catalysts have to be used in order to achieve a sufficient curing rate of the crosslinkable materials.

SUMMARY OF THE INVENTION

The invention relates to materials which can be crosslinked by condensation reaction and can be prepared using (B) heterocyclic compounds of the formula

  (I)

in which

A is a radical based on a heterocycle $AH_x$, containing at least one ring-forming element of the $3^{rd}$ and/or $5^{th}$ main group, in which x hydrogen atoms are replaced by chemical bonds to the $CR^1_2$ radical, at least one of these bonds being present at a ring-forming element of the $3^{rd}$ or $5^{th}$ main group, R are identical or different, monovalent, optionally substituted hydrocarbon radicals, $R^1$ may be identical or different and are a hydrogen atom or monovalent, optionally substituted hydrocarbon radicals, $R^2$ may be identical or different and are monovalent, optionally substituted hydrocarbon radicals, a is 0 or 1, preferably 0, and x is 1, 2 or 3, preferably 1 or 2, particularly preferably 1, and/or the partial hydrolysates thereof.

DETAILED DESCRIPTION OF THE PREFERRED EMBODIMENTS

The partial hydrolysates of the compounds of the formula (I) may be partial homohydrolysates as well as partial cohydrolysates. If the component (B) used according to the invention comprises partial hydrolysates of the compounds of the formula (I), those having up to 10 silicon atoms are preferred.

Radicals R are preferably optionally substituted, monovalent hydrocarbon radicals having 1 to 18 carbon atoms, more preferably alkyl radicals, the vinyl radical, the 3,3,3-trifluoroprop-1-yl radical and the phenyl radical, in particular the methyl radical.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl and phenanthryl radicals; alkaryl radicals such as the o-, m- and p-tolyl radicals xylyl radicals and ethylphenyl radicals; and aralkyl radicals such as the benzyl radical and the α- and β-phenylethyl radicals.

Examples of substituted radicals R are haloalkyl radicals such as the 3,3,3-trifluoroprop-1-yl radical, the 1,1,1,3,3,3-hexafluoroprop-2-yl radical and the heptafluoroprop-2-yl radical, haloaryl radicals such as the o-, m- and p-chlorophenyl radicals, and the 2-methoxyethyl radical, the 2-methoxyprop-1-yl radical and the 2-(2-methoxyethoxy)ethyl radical.

Examples of radicals $R^1$ are a hydrogen atom and the radicals stated for R.

Radicals $R^1$ are preferably a hydrogen atom and hydrocarbon radicals having 1 to 20 carbon atoms, in particular a hydrogen atom.

Examples of radicals $R^2$ are the radicals stated for R.

Radicals $R^2$ are preferably alkyl radicals having 1 to 6 carbon atoms, more preferably the methyl and ethyl radicals, and in particular the ethyl radical.

Radicals A are cyclic compounds having ring-forming atoms of at least two different elements, with the proviso that at least one ring-forming atom is an element of the $3^{rd}$ and/or $5^{th}$ main group which has a bonding site to the carbon atom of the radical —$CR^1_2$— in formula (I).

Radicals A are preferably cyclic organic compounds whose ring structures also contain at least one element of the $3^{rd}$ and/or $5^{th}$ main group and most preferably at least one further heteroatom in addition to carbon atoms.

Below, the designation "heteroatoms" is to be understood as meaning all ring-forming atoms except for carbon. The ring-forming heteroatoms in radical A are preferably nitrogen, phosphorus, oxygen, silicon and sulfur, most preferably nitrogen and oxygen.

Radicals A may also be optionally substituted, saturated or partly unsaturated heterocycles. If the ring A is substituted, the substituents are preferably halogen atoms, hydrocarbon radicals and organyloxy radicals, it being possible for these substituents to be polyvalent radicals which may be bonded to one or more ring-forming atoms.

Radicals A may also contain ring carbon atoms having oxygen or sulfur atoms bonded via a double bond, with the proviso that such ring carbon atoms have no direct bond to a ring-forming heteroatom of the $3^{rd}$ or $5^{th}$ main group which is bonded to a $CR^1_2$ radical of the formula (I).

The radical A may also contain ring carbon atoms having nitrogen or phosphorus atoms bonded via a double bond, which however is not preferred.

Radicals A are preferably 3-, 4-, 5-, 6-, 7- or 8-membered heterocycles which have, as ring-forming atoms, nitrogen and/or phosphorus and/or oxygen and/or sulfur as a heteroatom in addition to carbon, with the proviso that at least one ring-forming atom is an element of the $3^{rd}$ and/or $5^{th}$ main group, it also being possible for further rings to be fused on.

The heterocycles on which the radicals A are based are most preferably 5- and 6-membered heterocycles which contain a further ring heteroatom in addition to the heteroatom of the $3^{rd}$ and/or $5^{th}$ main group which is required for bonding to the $CR^1_2$ radical of the compounds of the formula (I).

Examples of heterocycles on which the radicals A are based are aziridine, azetidine, pyrrole, pyrrolidine, 1,3-oxazolidine, 1,3-thiazolidine, 1H-1,2-diazole, $\Delta^2$-1,2-diazoline, $\Delta^4$-1,2-diazoline, 1,3-diazole, $\Delta^2$-1,3-diazoline, $\Delta^4$-1,3-diazoline, 1,3-diazolidine, 1,2,3-triazole, 1,2,4-triazole, tetrazole, $\Delta^4$-1,2-diazolin-3-one, piperidine, tetrahydro-1,4-oxazine, tetrahydro-1,4-thiazine, hexahydro-1,3-diazine, hexahydro-1,4-diazine, 1-methylhexahydro-1,4-diazine, hexahydro-1,3,5-triazine, hexahydro-1,3-diazin-4-one, 4-methyl-hexahydro-1,4-diazin-3-one, 1H-azepine, hexahydro-azepine, octahydroazocine, 1H-benzo[b]pyrrole, 2,3-dihydrobenzo[b]pyrrole, 9H-dibenzopyrrole, benzo[d]-1,2-diazole, benzo[d]-1,3-diazole and benzo[d]-1,2,3-triazole.

Pyrrolidine, piperidine, tetrahydro-1,4-oxazine, tetrahydro-1,4-thiazine, tetrahydro-1,4-diazine and 1-methyltetrahydro-1,4-diazine are most preferred, in particular tetrahydro-1,4-oxazine.

Examples of heterocyclic compounds (B) are 1-(tri-ethoxysilylmethyl)aziridine, 1-(triethoxysilylmethyl)-azetidine, 1-(triethoxysilylmethyl)pyrrole, 1-(tri-ethoxysilylmethyl)pyrrolidine, 3-(triethoxysilyl-methyl)-1,3-oxazolidine, 3-(triethoxysilylmethyl)-1,3-thiazolidine, 1-(triethoxysilyl-methyl)-1H-1,2-diazole, 1-(triethoxysilylmethyl)-$\Delta^2$-1,2-diazoline, 1-(trieth-oxysilylmethyl)-$\Delta^4$-1,2-diazoline, 1-(triethoxysilyl-methyl)-1,3-diazole, 1-(triethoxysilylmethyl)-$\Delta^2$-1,3-diazoline, 1-(triethoxysilylmethyl)-$\Delta^4$-1,3-diazoline, 1-(triethoxysilylmethyl)-1,3-diazolidine, 1,3-bis(tri-ethoxysilylmethyl)-1,3-diazolidine, 1-(triethoxysilyl-methyl)-1H-1,2,3-triazole, 2-(triethoxysilylmethyl)-2H-1,2,3-triazole, 1-(triethoxysilylmethyl)-1H-1,2,4-triazole, 4-(triethoxysilylmethyl)-4H-1,2,4-triazole, 1-(triethoxysilylmethyl)-1H-tetrazole, 2-(triethoxy-silylmethyl)-2H-tetrazole, 1-(triethoxysilylmethyl)-$\Delta^4$-1,2-diazolin-3-one, 1-(triethoxysilylmethyl)piper-idine, 4-(triethoxysilylmethyl)tetrahydro-1,4-oxazine, 4-(1-(triethoxysilyl)ethyl)tetrahydro-1,4-oxazine, 4-(2-(triethoxysilyl)prop-2-yl)tetrahydro-1,4-oxazine, 4-(1-phenyl-1-(triethoxysilyl)ethyl)tetrahydro-1,4-oxazine, 4-(triethoxysilylmethyl)tetrahydro-1,4-thiazine, 1-(triethoxysilylmethyl)hexahydro-1,3-diazine, 1-(triethoxysilylmethyl)hexahydro-1,4-diazine, 1-methyl-4-(triethoxysilylmethyl)hexahydro-1,4-diazine, 1,4-bis(triethoxysilylmethyl)hexahydro-1,4-diazine, 1,4-bis(1-(triethoxysilyl)ethyl)hexahydro-1,4-diazine, 1-(triethoxysilylmethyl)hexahydro-1,3,5-triazine, 1,3-bis(triethoxysilylmethyl)hexahydro-1,3,5-triazine, 1,3,5-tris(triethoxysilylmethyl)hexahydro-1,3,5-triazine, 1-(triethoxysilylmethyl)-1,3-diazin-4-one, 1-(triethoxysilylmethyl)-4-methylhexahydro-1,4-diazin-3-one, 1-(triethoxysilylmethyl)-1H-azepine, 1-(triethoxysilylmethyl)hexahydroazepine, 1-(triethoxy-silylmethyl)octahydroazocine, 1-(triethoxysilylmethyl)-benzo[b]pyrrole, 1-(triethoxysilylmethyl)-2,3-dihydro-benzo[b]pyrrole, 9-(triethoxysilylmethyl)dibenzo-pyrrole, 1-(triethoxysilylmethyl)benzo[d]-1,2-diazole, 1-(triethoxysilylmethyl)benzo[d]-1,3-diazole and 1-(triethoxysilylmethyl)benzo[d]-1,2,3-triazole. Further examples are all abovementioned compounds in which the triethoxysilyl radical is replaced by a trimethoxysilyl radical, diethoxymethylsilyl radical or dimethoxymethylsilyl radical.

The heterocyclic compounds (B) used according to the invention are commercially available compounds or can be prepared by processes customary in chemistry.

In addition to the component (B) described above, the materials according to the invention may contain all substances which have also been used to date in materials crosslinkable by condensation reaction, such as, for example, an organosilicon compound having at least two condensable groups (A), further crosslinking agents (C), catalysts (D), a compound (E) having basic nitrogen, fillers (F), adhesion promoters (G), plasticizers (H) and additives (I), where (C), (E) and (G) differ from component (B).

The materials according to the invention are preferably those which can be prepared using (A) an organosilicon compound having at least two OH groups, (B) heterocyclic compounds of the formula (I), optionally (C) further crosslinking agents, optionally (D) a catalyst, optionally (E) a compound having basic nitrogen, optionally (F) fillers, optionally (G) adhesion promoters, optionally (H) plasticizers and optionally (I) additives.

The organosilicon compounds (A) used according to the invention may be all organosilicon compounds having at least two OH groups which have also been used to date in materials crosslinkable by condensation reaction.

Frequently, a distinction has been made to date in the literature between sealing compounds which have been prepared using polymers having OH groups and those which have been prepared using polymers which carry hydrolyzable groups. However, the materials crosslinkable by condensation reaction generally contain, as a crosslinking constituent, at least one polysiloxane having hydrolyzable groups. Moreover, monomeric or oligomeric silanes which likewise carry hydrolyzable groups are generally also present. In order to arrive at crosslinked structures, at least two such crosslinkable groups must be present per molecule. It is completely unimportant whether the crosslinkable polymers mentioned are formed by virtue of the fact that polymers having OH groups are obtained during the preparation of the sealing compound by reaction with, for example, the added silanes which carry crosslinkable groups or whether such polymers have been prepared beforehand in a separate step.

The organosilicon compounds (A) used according to the invention are preferably those containing units of the formula

$$R^3_b(OH)_c SiO_{(4-b-c)/2} \quad \text{(II)}$$

in which
R³ may be identical or different and are optionally substituted hydrocarbon radicals which may be interrupted by oxygen atoms,
b is 0, 1, 2 or 3, preferably 2, and
c is 0, 1, 2 or 3, preferably 0 or 1,
with the proviso that the sum of b+c is ≦3 and at least two condensable OH radicals are present per molecule.

Radicals R³ are preferably monovalent hydrocarbon radicals having 1 to 18 carbon atoms which are optionally substituted by halogen atoms, amino groups, ether groups, ester groups, epoxy groups, mercapto groups, cyano groups or (poly)glycol radicals, the latter being composed of oxyethylene and/or oxypropylene units, and radicals R³ are most preferably alkyl radicals having 1 to 12 carbon atoms, in particular the methyl radical.

Examples of radicals R³ are the examples stated for radical R.

Most preferably, organosilicon compounds (A) are substantially straight-chain, OH-terminated organopolysiloxanes, in particular α,ω-dihydroxydiorganopolysiloxanes. Examples of organosilicon compounds (A) are (HO)Me₂SiO[SiMe₂O]₃₀₋₂₀₀₀SiMe₂(OH) where Me is a methyl radical.

The organosilicon compounds (A) preferably have a viscosity of from 100 to 10⁶ mPa·s, more preferably from 10³ to 350,000 mPa·s, in each case at 25° C., and are commercially available products or can be prepared by methods customary in silicon chemistry.

The materials according to the invention preferably contain component (B) in amounts of, from 0.5 to 10 parts by weight, more preferably from 1 to 5 parts by weight, and in particular from 1 to 2.5 parts by weight, based in each case on 100 parts by weight of the material according to the invention.

The further crosslinking agents (C) optionally used in the invention may be any desired crosslinking agents known to date having at least three condensable radicals, for example, silanes having at least three organyloxy groups, which differ from component (B).

Most preferably, the optional further crosslinking agents (C) are silane crosslinking agents such as tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyano-propyltriethoxysilane, 3-(glycidyloxy)propyltriethoxysilane, 1,2-bis(trimethoxysilyl)ethane, 1,2-bis(triethoxysilyl)ethane, cyclohexylaminomethyltriethoxysilane, methyltriacetoxysilane, ethyltriacetoxysilane, N-(trimethoxysilylmethyl) O-methyl carbamate, N,N-dibutylaminomethyltriethoxysilane, triethoxysilylmethyl methacrylate, methyltris(methylethylketoximo)silane and vinyltris(methylethylketoximo)silane and the partial hydrolysates thereof.

The further crosslinking agents (C) optionally used in the materials according to the invention are commercially available products or can be prepared by processes known in silicon chemistry.

If the materials contain further crosslinking agents (C), amounts thereof are preferably from 0.1 to 10 parts by weight, more preferably from 0.2 to 5 parts by weight, and most preferably from 0.5 to 3 parts by weight, based in each case on 100 parts by weight of the material according to the invention.

Preferably, the materials contain additional crosslinking agents (C).

Examples of catalysts (D) are the titanium compounds already known to date, such as tetraisopropoxy titanate, and zirconium and hafnium compounds, zinc compounds, such as zinc (2-ethylhexanoate), and organic tin compounds, such as di-n-butyltin dilaurate and di-n-butyltin diacetate, di-n-butyltin oxide, dioctyltin diacetate, dioctyltin dilaurate, dioctyltin oxide and reaction products of these compounds with alkoxysilanes, such as tetraethoxysilane, di-n-octyltin oxide in tetraethyl silicate hydrolysate, di-n-octyltin oxide in a mixture of 50% by weight of methyltriethoxysilane hydrolysate and 50% by weight of 3-aminopropyltriethoxysilane and di-n-octyltin oxide in tetraisopropyl silicate being preferred, and reaction products of phosphoric acid esters and phosphoric acids with di-n-octyltin oxide in tetraethyl silicate hydrolysate, with di-n-octyltin oxide dissolved in a mixture of 50% by weight of methyltriethoxysilane hydrolysate and 50% by weight of 3-aminopropyltriethoxysilane and with di-n-octyltin oxide in tetraisopropyl silicate being particularly preferred.

If the materials according to the invention contain a catalyst (D), amounts thereof are preferably from 0.0001 to 2 parts by weight, more preferably from 0.001 to 1 part by weight, based in each case on 100 parts by weight of the material according to the invention.

The optional compounds (E) having basic nitrogen are preferably those selected from the group consisting of compounds of the formula

$$NR^6_3 \quad \text{(III)}$$

in which R⁶ may be identical or different and are a hydrogen atom or hydrocarbon radicals which are optionally substituted by hydroxyl groups, halogen atoms, amino groups, ether groups, ester groups, epoxy groups, mercapto groups, cyano groups or polyglycol radicals, the latter being composed of oxyethylene and/or oxypropylene units, with the proviso that, in formula (III), not more than two R⁶ have the meaning of the hydrogen atom, where, if a plurality of R⁶ are present, these may also be linked with one another to give cyclic structures, and organosilicon compounds having at least one organic radical having basic nitrogen, which differ from component (B), comprising units of the formula

$$R^7_k Y_l Si(OR^8)_m O_{(4-k-l-m)/2} \quad \text{(IV)}$$

in which
R⁷ may be identical or different and is a monovalent, SiC-bonded organic radical free of basic nitrogen,
R⁸ may be identical or different and has a meaning stated for radical R²,
Y may be identical or different and is a monovalent, SiC-bonded radical having basic nitrogen,
k is 0, 1, 2 or 3,
l is 0, 1, 2, 3 or 4 and
m is 0, 1, 2 or 3,
with the proviso that the sum of k+l+m is less than or equal to 4 and at least one radical Y is present per molecule.

Examples of radicals R⁶ and R⁷ are, in each case independently of one another, the examples for optionally substituted hydrocarbon radicals stated for R. The optionally substituted hydrocarbon radicals R⁶ are preferably those having 1 to 18 carbon atoms.

Radicals R⁷ are preferably hydrocarbon radicals having 1 to 18 carbon atoms, the methyl, ethyl and n-propyl radical being particularly preferred, in particular the methyl radical.

Examples of radical $R^8$ are the examples stated for radical $R^2$. Preferably, radical $R^8$ is the methyl or ethyl radical.

Examples of radicals Y are radicals of the formulae $H_2NCH_2$—, $H_2N(CH_2)_2$—, $H_2N(CH_2)_3$—, $H_2N(CH_2)_2NH(CH_2)_2$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $H_3CNH(CH_2)_2$—, $C_2H_5NH(CH_2)_2$—, $H_2N(CH_2)_4$—, $H_2N(CH_2)_5$—, $H(NHCH_2CH_2)_3$—, $C_4H_9NH(CH_2)_2NH(CH_2)_2$—, cyclo-$C_6H_{11}NH(CH_2)_3$—, cyclo-$C_6H_{11}NH(CH_2)_2$—, $(CH_3)_2N(CH_2)_3$—, $(CH_3)_2N(CH_2)_2$—, $(C_2H_5)_2N(CH_2)_3$— and $(C_2H_5)_2N(CH_2)_2$—.

Y is preferably a $H_2N(CH_2)_3$—, $H_2N(CH_2)_2NH(CH_2)_3$—, $H_3CNH(CH_2)_3$—, $C_2H_5NH(CH_2)_3$— and cyclo-$C_6H_{11}NH(CH_2)_3$-radical, with $H_2N(CH_2)_2NH(CH_2)_3$— and cyclo-$C_6H_{11}NH(CH_2)_3$— radicals being particularly preferred.

If the organosilicon compounds comprising units of the formula (IV) are silanes, k is preferably 0, 1 or 2, more preferably 0 or 1, 1 is preferably 1 or 2, more preferably 1, and m is preferably 1, 2 or 3, more preferably 2 or 3, with the proviso that the sum of k+l+m is 4.

Examples of the silanes of the formula (IV) which are optionally used according to the invention are $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_2NH(CH_2)_3$—$Si(OC_2H_5)_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, $HN((CH_2)_3$—$Si(OCH_3)_3)_2$ and $HN((CH_2)_3$—$Si(OC_2H_5)_3)_2$ and the partial hydrolysates thereof, where $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, cyclo-$C_6H_{11}NH(CH_2)_3$—$Si(OC_2H_5)_3$, cyclo-$C_6H_{11}NH(CH_2)_3$—$Si(OCH_3)_2CH_3$ and cyclo-$C_6H_{11}NH(CH_2)_3$—$Si(OC_2H_5)_2CH_3$ are preferred and $H_2N(CH_2)_2NH(CH_2)_3$—$Si(OC_2H_5)_3$, $H_2N(CH_2)_2NH(CH_2)_3$—$Si(OC_2H_5)_2CH_3$, cyclo-$C_6H_{11}NH(CH_2)_3$—$Si(OC_2H_5)_3$ and cyclo-$C_6H_{11}NH(CH_2)_3$—$Si(OC_2H_5)_2CH_3$ and in each case the partial hydrolysates thereof are particularly preferred.

If the organosilicon compounds comprising units of the formula (IV) are organopolysiloxanes, the average value of k is preferably from 0.5 to 2.5, more preferably from 1.4 to 2.0, the average value of l is preferably from 0.01 to 1.0, more preferably from 0.01 to 0.6, and the average value of m is preferably from 0 to 2.0, more preferably from 0 to 0.2, with the proviso that the sum of k, l and m is less than or equal to 3.

The organopolysiloxanes which can be used according to the invention and comprise units of the formula (IV) preferably have a viscosity at 25° C. of from 5 to $10^5$ mP·a s, more preferably from 10 to $10^4$ mPa·s.

Examples of the organopolysiloxanes which can be used according to the invention and comprise units of the formula (IV) are
$H_2N(CH_2)_3$—$Si(OCH_3)_2$—O—$Si(CH_3)$ $(OCH_3)_2$, $H_2N(CH_2)_3$—$Si(OC_2H_5)_2$—O—$Si(CH_3)$ $(OCH_3)_2$, $H_2N(CH_2)_3$—$Si(OC_2H_5)_2$—O—$Si(CH_3)$ $(OC_2H_5)_2$, $H_2N(CH_2)_3$—$Si(OCH_3)$ $(CH_3)$—O—$Si(CH_3)$ $(OCH_3)_2$, $H_2N(CH_2)_3$—$Si(OCH_3)$ $(CH_3)$—O—$Si(OCH_3)_2$, $H_2N(CH_2)_3$—$Si(OC_2H_5)$ $(CH_3)$—O—$Si(OCH_3)_2$, $H_2N(CH_2)_2NH(CH_2)_3$—$Si(OCH_3)_2$—O—$Si(CH_3)$ $(OCH_3)_2$, $H_2N(CH_2)_2NH(CH_2)_3$—$Si(OC_2H_5)_2$—O—$Si(CH_3)$ $(OC_2H_5)_2$, $H_2N(CH_2)_2NH(CH_2)_3$—$Si(OCH_3)$ $(CH_3)$—O—$Si(OCH_3)_3$, $H_2N(CH_2)_2NH(CH_2)_3$—$Si(OC_2H_5)$ $(CH_3)$—O—$Si(OCH_3)_3$, cyclo-$C_6H_{11}NH(CH_2)_3$—$Si(OCH_3)_2$—O—$Si(CH_3)$ $(OCH_3)_2$, cyclo-$C_6H_{11}NH(CH_2)_3$—$Si(OC_2H_5)_2$—O—$Si(CH_3)$ $(OCH_3)_2$, cyclo-$C_6H_{11}NH(CH_2)_3$—$Si(OC_2H_5)_2$—O—$Si(CH_3)$ $(OC_2H_5)_2$, cyclo-$C_6H_{11}NH(CH_2)_3$—$Si(OCH_3)$ $(CH_3)$—O—$Si(CH_3)$ $(OCH_3)_2$, cyclo-$C_6H_{11}NH(CH_2)_3$—$Si(OCH_3)$ $(CH_3)$—)—$Si(OCH_3)_3$ and cyclo-$C_6H_{11}NH(CH_2)_3$—$Si(OC_2H_5)$ $(CH_3)$—O—$Si(OCH_3)_3$, $H_2N(CH_2)_3$—$Si(OCH_3)_2$—(O—$Si(CH_3)_2)_{1-100}$—0—$Si(OCH_3)_2$—$(CH_2)_3$ $NH_2$, $H_2N(CH_2)_2NH(CH_2)_3$—$Si(OCH_3)_2$—(O—$Si(CH_3)_2)_{1-100}$-0—$Si(OCH_3)_2$ —$(CH_2)_3NH(CH_2)_2NH_2$ and cyclo-$C_6H_{11}NH(CH_2)_3$—$Si(OCH_3)_2$—(O—$Si(CH_3)_2)_{1-100}$—O—$Si(OCH_3)_2$—$(CH_2)_3NH$ cyclo-$C_6H_{11}$ and the partial hydrolysates thereof, a partial hydrolysate of $H_2N(CH_2)_3$—$Si(OC_2H_5)_2$—O—$Si(CH_3)$ $(OC_2H_5)_2$ being particularly preferred.

Organosilicon compounds comprising units of the formula (IV) are commercially available products or can be prepared by processes customary in silicon chemistry.

Examples of amines of the formula (III) are cyclohexylamine, triethylamine, trioctylamine, butylamine, dodecylamine, diethyl-n-propylamine, cyclohexylmethylamine, 2-aminoethanol, 2-amino-n-propanol, 2-amino-2-methyl-1-propanol, 2-dimethylamino-2-methyl-1-propanol, N,N-diethylethanolamine, ethylene-diamine, coconut fatty amine, coconut fatty methylamine, N,N-dimethylethanolamine and aniline.

If component (E) is used, it is preferably an organosilicon compound comprising units of the formula (IV). If the materials according to the invention contain component (E), amounts therof are preferably from 0.001 to 2 parts by weight, more preferably from 0.01 to 1 part by weight, based in each case on 100 parts by weight of the material. Preferably, the materials contain component (E).

Examples of fillers (F) are non-reinforcing fillers, i.e. fillers having a BET surface area of up to 50 $m^2$/g, such as quartz, diatomaceous earth, calcium silicate, zirconium silicate, zeolites, metal oxide powders, such as aluminum, titanium, iron or zinc oxides or mixed oxides thereof, barium sulfate, calcium carbonate, gypsum, silicon nitride, silicon carbide, boron nitride, glass powder and plastics powder, such as polyacrylonitrile powder; reinforcing fillers, i.e. fillers having a BET surface area of more than 50 $m^2$/g, such as pyrogenically prepared silica, precipitated silica, precipitated calcium carbonate, carbon black, such as furnace black and acetylene black, and silicon-aluminum mixed oxides of large BET surface area; fibrous fillers, such as asbestos and plastics fibers. Said fillers can be hydrophobized, for example by treatment with organosilanes or organosiloxanes or by etherification of hydroxyl groups to give alkoxy groups. If fillers (F) are used, they are preferably hydrophilic pyrogenic silica, precipitated calcium carbonate and marble powder.

If the materials according to the invention contain component (F), amounts thereof are preferably from 1 to 80 parts by weight, more preferably from 5 to 65 parts by weight, based in each case on 100 parts by weight of material. Preferably, the materials contain component (F).

Examples of the optional adhesion promoters (G) are silanes and organopolysiloxanes having functional groups such as those having glycidyloxypropyl, aminopropyl, aminoethylaminopropyl, ureidopropyl or methacryloyloxypropyl radicals. If, however, another component, for example, organosilicon compound (A), (B), (C) or (E), has such functional groups, then addition of the adhesion promoter (G) can be dispensed with.

If the inventive materials contain component (G), amounts thereof are preferably from 0.01 to 10 parts by weight, more preferably from 0.1 to 2.5 parts by weight, based in each case on 100 parts by weight of the material. Preferably, the materials contain component (G).

Examples of plasticizers (H) are dimethylpolysiloxanes which are liquid at room temperature and endcapped by trimethylsilyloxy groups, in particular having viscosities at 25° C. in the range from 5 to 1000 mPa·s, and high-boiling hydrocarbons, such as, for example, liquid paraffins or mineral oils consisting of naphthenic and paraffinic units.

If the materials contain component (H), amounts thereof are preferably from 1 to 50 parts by weight, more preferably from 10 to 35 parts by weight, based in each case on 100 parts by weight of the material. Preferably, the materials contain component (H).

Examples of additives (I) are pigments, dyes, fragrances, antioxidants, compositions for influencing the electrical properties such as conductive carbon black, flame-retardant compositions, light stabilizers and compositions for prolonging the skin formation time such as silanes having an SiC-bonded mercaptoalkyl radical, cell-generating compositions, e.g. azodicarbonamide, heat stabilizers and thixotropic agents such as polyethers, and organic solvents such as alkylaromatics, biocides such as fungicides, bactericides, acaricides, and compositions for regulating the modulus, such as polydimethylsiloxanes having a terminal OH group.

If the materials contain component (I), amounts thereof are preferably from 0.0001 to 10 parts by weight, more preferably from 0.001 to 10 parts by weight, based in each case on 100 parts by weight of the material.

Most preferably, the materials are those which can be prepared using
(A) organosilicon compounds containing units of the formula (II),
(B) compounds of the formula (I), optionally
(C) a crosslinking agent, optionally
(D) a catalyst, optionally
(E) a compound having basic nitrogen, optionally
(F) fillers, optionally
(G) an adhesion promoter, optionally
(H) a plasticizer and optionally
(I) additives.

Furthermore, the materials according to the invention are in particular those which can be prepared using
(A) organosilicon compounds containing units of the formula (II),
B) compounds of the formula (I), optionally
(C) a crosslinking agent, optionally
(D) a catalyst,
(E) a compound having basic nitrogen,
(F) hydrophilic pyrogenic silica, optionally
(G) an adhesion promoter,
(H) a plasticizer and optionally
(I) additives.

In these last-mentioned materials, constituent (E) is preferably used in an amount of from 0.2 to 50 μmol, more preferably from 1 to 20 μmol, of amine nitrogen of the constituent (E) per $m^2$ BET surface area of the constituent (F).

In particular, no further constituents over and above the components (A) to (I) are used for the preparation of the materials according to the invention.

The individual constituents of the materials according to the invention may be in each case one type of such a constituent or a mixture of at least two different types of such constituents.

For the preparation of the materials according to the invention, all constituents can be mixed with one another in any desired sequence. This mixing can be effected at room temperature and the pressure of the surrounding atmosphere, i.e. from about 900 to 1100 hPa, or under reduced pressure of from about 20 hPa to 800 hPa. If desired, this mixing can, however, also be effected at higher temperatures, for example at temperatures in the range from 35 to 135° C. If desired, heating or cooling may be effected.

The mixing, according to the invention, of the individual components preferably takes place with very substantial exclusion of water from the surrounding atmosphere, which can be realized, for example, by blanketing with dry air.

The sequence in which polymer, crosslinking agent and plasticizer are mixed is unimportant. For convenient processing, polymer (A) and optionally plasticizer (H) are preferably initially introduced and component (B) and optionally crosslinking agent (C) are then added.

If fillers (F) are added, component (A), component (B), optionally component (C) and optionally amine (E) are preferably mixed thoroughly with one another before filler (F), preferably hydrophilic silica, is added. If component (E) is used, the ratio of (E) to (F) is preferably chosen so that at least 0.2 μmol of compounds (E) having basic nitrogen is used per square meter of BET surface area of the filler (F).

If fillers (F) and plasticizers (H) are added, the mixture comprising polymer (A), plasticizer (H) and component (B) and optionally crosslinking agent (C) is preferably thoroughly mixed by stirring. The abovementioned reaction between organosilicon compound (A) and compounds (B) and optionally crosslinking agent (C) takes place.

If hydrophilic pyrogenic silica is added as fillers (F), component (A), plasticizer (H), component (B) and optionally components (C) are preferably thoroughly mixed with one another prior to the addition of filler (F) until at least 90% of the OH groups of the organosilicon compound (A) have reacted with the constituents (B) and (C), component (E) being added at any desired time before the addition of the pyrogenic silica. Preferably, the ratio of (E) to (F) is chosen so that at least 0.2 μmol of compounds (E) having basic nitrogen is used per square meter of BET surface area of the filler.

Occasionally, if plasticizer (H) is used, all or at least parts of the total amount of the plasticizer is or are added only after the fillers. This procedure is referred to as pasting and serves for better homogeneous distribution of poorly dispersible fillers owing to the substantially higher viscosity of the mixture in this procedure. At the end of the pasting phase, the mixing is then completed by addition of the remaining plasticizer. This procedure is, however, not preferred.

Furthermore, the point at which catalyst (D) is added is as a rule unimportant. Expediently, however, the catalyst is not added until the end, since the mixture is then activated. The person skilled in the art will in practice wish to avoid excessively long mixing of very reactive sealing compounds since complete exclusion of moisture in the preparation of the mixture is difficult or at least uneconomical. Occasionally, it is also necessary that the catalyst does not come into contact with a polymer-crosslinking agent mixture which still contains relatively large amounts of unconverted OH groups, since premature crosslinking of the mixture may then take place from time to time. For this reason, too, the person skilled in the art will avoid adding the catalyst too early. As an exception, the person skilled in the art will add the crosslinking catalyst too, at the beginning of the preparation of the mixture, only when this is simultaneously a catalyst for the reaction of the OH polymers with the crosslinking agent.

The mixing of the constituents can be interrupted at any desired point for any desired time, in particular after mixing of the organosilicon compound (A) with compound (B) and optionally crosslinking agent (C). Preferably, however, the preparation of the mixture should be carried out in a short time sequence, in particular in a continuous process.

After mixing of all desired constituents, the mixture is preferably devolatilized and is introduced into moisture-tight containers.

The preparation, according to the invention, of the crosslinkable materials according to the invention can be carried out both batchwise and continuously.

In the continuous procedure, first organosilicon compound (A) is preferably continuously mixed with compound (B) and optionally plasticizer (H), preferably using a dynamic mixer, the reaction time of organo-silicon compound (A) with compounds (B) being from 1 to 60 minutes, before further constituents of the mixture are optionally mixed in. For example, the reaction times can be adjusted by targeted design of pipe lengths and pipe cross sections in the continuously operating plant. In the continuous process according to the invention, the reaction time is preferably such that at least 90% of the OH groups of the organosilicon compound (A) have reacted with compounds (B). Thereafter, crosslinking agent (C), compound (E) having basic nitrogen, adhesion promoter (G) and plasticizer (H) can be mixed in continuously, for example using a static mixer.

If desired, this is followed, preferably without intermediate storage, by the continuous mixing in of fillers (F), such as finely divided silica, it being possible to use, for example, mixers having a rotor/stator system.

Before the possible addition of the catalyst (D) and of additives (I), the material according to the invention can be continuously devolatilized, for example with the aid of a twin-screw extruder.

The customary water content of the air is sufficient for the crosslinking of the materials according to the invention. The crosslinking of the materials according to the invention is preferably effected at room temperature. It can, if desired, also be carried out at higher or lower temperatures than room temperature, e.g. at from −5° C. to 15° C. or at from 30° C. to 50° C., and/or by means of water concentrations exceeding the normal water content of the air.

Preferably, the crosslinking is carried out at a pressure of from 100 to 1100 hPa, in particular at the pressure of the surrounding atmosphere.

The present invention furthermore relates to moldings produced by crosslinking the materials according to the invention.

The materials according to the invention can be used for all intended uses for which materials storable in the absence of water and crosslinkable on admission of water at room temperature to give elastomers can be used.

The materials according to the invention are therefore excellently suitable, for example, as sealing compounds for joints, including vertical joints, and similar cavities having a clearance of, for example, from 10 to 40 mm, for example of buildings, land and water vehicles and aircraft, or as adhesives or cementing compounds, for example in window construction, or in the production of aquaria or showcases, and, for example, for the production of protective coatings, including those for surfaces exposed to the continuous action of fresh or seawater, or non-slip coatings, or of elastomeric moldings and for the insulation of electrical or electronic apparatuses.

The materials according to the invention have the advantage that they can be easily prepared and have high storage stability over a long period.

The materials according to the invention have the advantage that no toxicologically unsafe cleavage products form.

Furthermore, the materials according to the invention have the advantage that no toxicologically unsafe catalysts or only very small amounts thereof have to be used.

Furthermore, the materials according to the invention have the advantage that very uniform curing throughout can also be achieved in a thick layer, and that, when used on, for example, substrate surfaces heated by sunlight, no bubbles form in the sealing compound and at the boundary of sealing compound and substrate surface.

The materials according to the invention have the advantage that, with the use of aqueous smoothing agents, no clearly visible spots form on the surface of the sealing compound.

Furthermore, the materials according to the invention have the advantage that the skin formation time can be adjusted within very wide limits by varying the catalyst concentration.

Furthermore, the materials according to the invention have the advantage that they can be prepared completely continuously.

In the examples described below, all viscosity data are based on a temperature of 25° C. Unless stated otherwise, the following examples are carried out at a pressure of the surrounding atmosphere, i.e. at about 1000 hPa, and at room temperature, i.e. at about 23° C., or at a temperature which results on combining the reactants at room temperature without additional heating or cooling, and at a relative humidity of about 50%. Furthermore, all stated parts and percentages are based on weight, unless stated otherwise.

The Shore A hardness is determined according to DIN (German Industrial Standard) 53505-87.

The tensile strength is determined according to DIN 53504-85 S2.

The elongation at break is determined according to DIN 53504-85 S2.

The modulus is the stress value at 100% strain.

EXAMPLE 1

350 g of an α,ω-dihydroxypolydimethylsiloxane having a viscosity of 80,000 mPa·s, 150 g of an α,ω-trimethylsilyloxy-polydimethylsiloxane having a viscosity of 1000 mPa·s, 13.6 g of 4-(triethoxysilylmethyl)tetrahydro-1,4-oxazine, 20 g of vinyltriethoxysilane, 12 g of tetraethoxysilane, 4.4 g of a mixture of 1 part by weight of methyltrimethoxysilane hydrolysate oligomers having on average 10 Si atoms per molecule and 1 part by weight of 3-aminopropyltriethoxysilane were mixed thoroughly with one another for 15 minutes in a planetary dissolver. Thereafter, 45 g of hydrophilic pyrogenic silica having a BET surface area of 150 m$^2$/g were added (commercially available under the name HDK® V15 from Wacker Chemie AG, Munich, Germany) and mixing was effected for a further 15 minutes. A reduced pressure of about 200 hPa was applied for devolatilizing the mixture, and mixing was effected again for 5 minutes. Thereafter, the prepared mixture was introduced into commercially available polyethylene cartridges. According to ISO 7390, a flow-resistant material was obtained, i.e. the material did not run out of a vertically suspended U-shaped aluminum profile.

2 mm thick sheets of this mixture were spread onto a polyethylene film, which were detached from the film after curing for one day and suspended so that air could be admitted from all sides for a further 6 days so that the samples were cured over 7 days altogether. The relative humidity was set at 50%, the temperature being regulated at 23° C. Test specimens of the form S2 according to DIN 53504-85 were then punched out from these sheets and the mechanical characteristics were measured. For determining the hardness, 6 mm thick test specimens were produced and were likewise cured over 7 days at a relative humidity of 50% and a temperature of 23° C. by reaction with the surrounding atmospheric humidity.

Moreover, the skin formation time and the time to freedom from surface tack were determined, in each case once again at 50% relative humidity and 23° C. The skin formation time is determined in such a way that the surface of a freshly spread material is gently touched with the tip of a pencil at intervals of 3 minutes. The skin formation time is reached when the material no longer remains adhering to the tip of the pencil. The freedom from tack is established by feeling with the fingers at intervals of 30 minutes. When the surface tack is no longer detected, freedom from tack has been achieved.

The results are to be found in Table 1.

EXAMPLE 2

350 g of an α,ω-dihydroxypolydimethylsiloxane having a viscosity of 80,000 mPa·s, 150 g of an α,ω-trimethylsilyloxy-polydimethylsiloxane having a viscosity of 1000 mPa·s, 10 g of 4-(triethoxysilylmethyl)tetrahydro-1,4-oxazine, 15 g of vinyltriethoxysilane, 9 g of tetraethoxysilane, 10 g of a mixture of 1 part by weight of methyltrimethoxysilane hydrolysate oligomers having on average 10 Si atoms per molecule and 1 part by weight of 3-aminopropyltriethoxysilane were thoroughly mixed with one another for 15 minutes in a planetary dissolver. Thereafter, 48 g of hydrophilic pyrogenic silica having a BET surface area of 150 $m^2/g$ were added (commercially available under the name HDK® V15 from Wacker Chemie AG, Munich, Germany) and mixing was effected for a further 15 minutes. Thereafter, the mixing was completed by addition of 0.4 g of a reaction product of dioctyltin diacetate with tetraethoxysilane in the molar ratio 1:2, the resulting ethyl acetate being distilled off, and 0.3 g of a 50% strength by weight solution of octylphosphonic acid in methyltrimethoxysilane. For devolatilization of the mixture, a reduced pressure of about 200 hPa was applied and mixing was effected once again for 5 minutes. Thereafter, the prepared mixture was introduced into commercially available polyethylene cartridges. A flow-resistant material was obtained.

The characteristics of this mixture were determined analogously to Example 1 and are listed in Table 1.

EXAMPLE 3

350 g of an α,ω-dihydroxypolydimethylsiloxane having a viscosity of 80,000 mPa·s, 150 g of an α,ω-trimethylsilyloxy-polydimethylsiloxane having a viscosity of 1000 mPa·s, 13.6 g of 4-(triethoxysilylmethyl)tetrahydro-1,4-oxazine, 20 g of vinyltriethoxysilane, 12 g of tetraethoxysilane, 4.4 g of a mixture of 1 part by weight of methyltrimethoxysilane hydrolysate oligomers having on average 10 Si atoms per molecule and 1 part by weight of 3-aminopropyltriethoxysilane were thoroughly mixed with one another for 15 minutes in a planetary dissolver. Thereafter, 45 g of hydrophilic pyrogenic silica having a BET surface area of 150 $m^2/g$ were added (commercially available under the name HDK® V15 from Wacker Chemie AG, Munich, Germany) and mixing was effected for a further 15 minutes. Thereafter, the mixing was completed by addition of 6 g of zinc 2-ethylhexanoate (commercially available under the name Catalyst A42 from Wacker Chemie AG, Munich, Germany). For devolatilization of the mixture, a reduced pressure of about 200 hPa was applied and mixing was effected once again for 5 minutes. Thereafter, the prepared mixture was introduced into commercially available polyethylene cartridges. A flow-resistant material was obtained.

The characteristics of this mixture were determined analogously to Example 1 and are listed in Table 1.

EXAMPLE 4

350 g of an α,ω-dihydroxypolydimethylsiloxane having a viscosity of 80,000 mPa·s, 150 g of an α,ω-trimethylsilyloxy-polydimethylsiloxane having a viscosity of 1000 mPa·s, 13.6 g of 4-(triethoxysilylmethyl)tetrahydro-1,4-oxazine, 20 g of vinyltriethoxysilane, 12 g of tetraethoxysilane, 8.6 g of a mixture of 1 part by weight of methyltrimethoxysilane hydrolysate oligomers having on average 10 Si atoms per molecule and 1 part by weight of 3-aminopropyltriethoxysilane were thoroughly mixed with one another for 15 minutes in a planetary dissolver. Thereafter, 45 g of hydrophilic pyrogenic silica having a BET surface area of 150 $m^2/g$ were added (commercially available under the name HDK® V15 from Wacker Chemie AG, Munich, Germany), 112 g of precipitated $CaCO_3$ having a median particle diameter (D50%) of about 2.0 μm (commercially available under the name "Precarb 200" from Schafer Kalk KG, Diez, Germany), 448 g of marble powder having a median particle diameter (D50%) of about 5.0 m (commercially available under the name "OMYA 5 GU" from OMYA, Cologne, Germany) were added and mixing was effected for a further 20 minutes. Thereafter, the mixing was completed by addition of 0.37 g of a reaction product of dibutyltin diacetate with tetraethoxysilane in the molar ratio 1:2, the resulting ethyl acetate being distilled off, and 0.4 g of a 50% strength by weight solution of octylphosphonic acid in methyltrimethoxysilane and mixing was effected for a further 5 minutes. For devolatilization of the mixture, a reduced pressure of about 200 hPa was applied and mixing was effected again for 5 minutes. Thereafter, the prepared mixture was introduced into commercially available polyethylene cartridges. A flow-resistant material was obtained.

The characteristics of this mixture were determined analogously to Example 1 and are listed in Table 1.

EXAMPLE 5

350 g of an α,ω-dihydroxypolydimethylsiloxane having a viscosity of 80,000 mPa·s, 150 g of an α,ω-trimethylsilyloxy-polydimethylsiloxane having a viscosity of 1000 mPa·s, 13.6 g of 4-(triethoxysilylmethyl)tetrahydro-1,4-oxazine, 20 g of vinyltriethoxysilane, 12 g of tetraethoxysilane, 8.6 g of a mixture of 1 part by weight of methyltrimethoxysilane hydrolysate oligomers having on average 10 Si atoms per molecule and 1 part by weight of 3-aminopropyltriethoxysilane were thoroughly mixed with one another for 15 minutes in a planetary dissolver. Thereafter, 45 g of hydrophilic pyrogenic silica having a BET surface area of 150 $m^2/g$ were added (commercially available under the name HDK® V15 from Wacker Chemie AG, Munich, Germany), 560 g of marble powder having a median particle diameter (D50%) of about 5.0 m (commercially available under the name "OMYA 5GU" from OMYA, Cologne, Germany) were added and mixing was effected for a further 20 minutes. Thereafter, the mixing was completed by addition of 0.37 g of a reaction product of dibutyltin diacetate with tetraethoxysilane in the molar ratio 1:2, the resulting ethyl acetate being distilled off, and 0.4 g of a 50% strength by weight solution of octylphosphonic acid in methyltrimethoxysilane and mixing was effected for a further 5 minutes. For devolatilization of the mixture, a reduced pressure of about 200 hPa was applied and mixing was effected again for 5 minutes. Thereafter, the prepared mixture was introduced into commercially available polyethylene cartridges. A flow-resistant material was obtained.

The characteristics of this mixture were determined analogously to Example 1 and are listed in Table 1.

EXAMPLE 6

350 g of an α,ω-dihydroxypolydimethylsiloxane having a viscosity of 80,000 mPa·s, 150 g of an α,ω-trimethylsilyloxypolydimethylsiloxane having a viscosity of 1000 mPa·s, 13.6 g of 4-(triethoxysilylmethyl)tetrahydro-1,4-oxazine, 20 g of vinyltriethoxysilane, 12 g of tetraethoxysilane, 8.6 g of a mixture of 1 part by weight of methyltrimethoxysilane hydrolysate oligomers having on average 10 Si atoms per molecule and 1 part by weight of 3-aminopropyltriethoxysilane were thoroughly mixed with one another for 15 minutes in a planetary dissolver. Thereafter, 45 g of hydrophilic pyrogenic silica having a BET surface area of 150 m$^2$/g were added (commercially available under the name HDK® V15 from Wacker Chemie AG, Munich, Germany), 560 g of marble powder having a median particle diameter (D50%) of about 5.0 μm (commercially available under the name "OMYA 5GU" from OMYA, Cologne, Germany) were added and mixing was effected for a further 20 minutes. Thereafter, the mixing was completed by addition of 11.6 g of zinc 2-ethylhexanoate (commercially available under the name "Catalyst A42" from Wacker Chemie AG, Munich, Germany) and mixing was effected for a further 5 minutes. For devolatilization of the mixture, a reduced pressure of about 200 hPa was applied and mixing was effected again for 5 minutes. Thereafter, the prepared mixture was introduced into commercially available polyethylene cartridges. A flow-resistant material was obtained.

The characteristics of this mixture were determined analogously to Example 1 and are listed in Table 1.

EXAMPLE 7

450 g of an α,ω-dihydroxypolydimethylsiloxane having a viscosity of 80,000 mPa·s, 50 g of an α,ω-trimethylsilyloxypolydimethylsiloxane having a viscosity of 1000 mPa·s, 12.4 g of 4-(triethoxysilylmethyl)tetrahydro-1,4-oxazine, 16.9 g of vinyltrimethoxysilane and 10.5 g of tetraethoxysilane were thoroughly mixed with one another for 5 minutes in a planetary dissolver. Thereafter, 50 g of hydrophilic pyrogenic silica having a BET surface area of 150 m$^2$/g were added (commercially available under the name HDK® V15 from Wacker Chemie AG, Munich, Germany) and mixing was effected for a further 15 minutes. For devolatilization of the mixture, a vacuum of about 200 hPa was applied and mixing was effected again for 5 minutes. Thereafter, the prepared mixture was introduced into commercially available polyethylene cartridges. A material which was readily self-leveling and therefore not flow-resistant was obtained.

The characteristics of this mixture were determined analogously to Example 1 and are listed in Table 1.

EXAMPLE 8

700 kg/h of an α,ω-dihydroxypolydimethylsiloxane having a viscosity of 80,000 mPa·s, 300 kg/h of an α,ω-trimethylsilyloxypolydimethylsiloxane having a viscosity of 1000 mPa·s. and 27 kg/h of 4-(triethoxysilylmethyl)tetrahydro-1, 4-oxazine were mixed continuously with the aid of a dynamic mixer. The mixture was transported in a pipeline to a static mixer, the average residence time of the material being mixed being about 20 minutes. 40 kg/h of vinyltriethoxysilane, 24 kg/h of tetraethoxysilane and 9 kg/h of a mixture of 1 part by weight of methyltrimethoxysilane hydrolysate oligomers having on average 10 Si atoms per molecule and 1 part by weight of 3-aminopropyltriethoxysilane were mixed into the mixture obtained by means of the static mixer. Immediately thereafter, 90 kg/h of hydrophilic pyrogenic silica having a BET surface area of 150 m$^2$/g (commercially available under the name HDK® V15 from Wacker Chemie AG, Munich, Germany) were mixed in. A mixer having a rotor/stator mixing system, as described in EP-B-10146 395, which is part of the disclosure content of the present invention, was used.

Thereafter, the mixture was devolatilized with the aid of a twin-screw extruder and introduced into commercially available moisture-tight drums having inliners. A flow-resistant material was obtained.

The characteristics of this mixture were determined analogously to Example 1 and are listed in Table 1.

TABLE 1

| Example | Skin formation time [min] | Freedom from tack [h] | Hardness [ShA] | Tensile strength [MPa] | Modulus [MPa] | Elongation at break [%] |
|---|---|---|---|---|---|---|
| 1 | 120 | 8 | 14 | 1.38 | 0.26 | 690 |
| 2 | 45 | 3.5 | 18 | 1.64 | 0.32 | 600 |
| 3 | 55 | 8 | 17 | 1.34 | 0.26 | 660 |
| 4 | 30 | 2 | 44 | 1.82 | 0.96 | 490 |
| 5 | 30 | 2 | 40 | 1.63 | 0.87 | 520 |
| 6 | 40 | 2.5 | 31 | 1.57 | 0.58 | 850 |
| 7 | 3 | 4 | 19 | 2.43 | 0.40 | 600 |
| 8 | 110 | 8 | 13 | 1.44 | 0.25 | 680 |

The invention claimed is:

1. A storage stable condensation-crosslinkable RTV-1 composition prepared by mixing components of the composition together with the substantial exclusion of water and which cures upon exposure to water, comprising:

(B) at least one heterocyclic compound of the formula

$$A[CR^1{}_2SiR_a(OR^2)_{3-a}]_x \quad (I)$$

in which

A is a radical derived from a heterocycle AH$_x$ containing at least one ring-forming element of the 3$^{rd}$ and/or 5$^{th}$ main groups of the periodic table, in which x hydrogen atoms are replaced by chemical bonds to the CR$^1{}_2$ radical, at least one of these bonds being present at a ring-forming element of the 3$^{rd}$ or 5$^{th}$ main group, R are identical or different monovalent, optionally substituted hydrocarbon radicals, R$^1$ are identical or different and are hydrogen or monovalent optionally substituted hydrocarbon radicals, R² are identical or different and are monovalent optionally substituted hydrocarbon radicals,
a is 0 or 1, and
x is 1, 2 or 3,
and/or the partial hydrolysates thereof,
with the proviso that when radical A contains carbon atoms having oxygen or sulfur atoms bonded via a double bond, these carbon atoms have no direct bond to a ring-forming heteroatom of the $3^{rd}$ or $5^{th}$ main group of the periodic table which is bonded to a $CR^1{}_2$ radical if formula (I).

2. The crosslinkable composition of claim 1, wherein radicals A are cyclic compounds having ring-forming atoms of at least two different elements, with the proviso that at least one ring-forming atom is an element of the $3^{rd}$ and/or $5^{th}$ main group which has a bonding site to the carbon atom of the radical —$CR^1{}_2$— in formula (I).

3. The crosslinkable composition of claim 1, wherein radicals A are 3-, 4-, 5-, 6-, 7- or 8-membered heterocycles which have, as ring-forming atoms, at least one of nitrogen, phosphorus, oxygen, and sulfur as a heteroatom in addition to ring carbon atoms, with the proviso that at least one ring-forming atom is an element of the $3^{rd}$ and/or $5^{th}$ main group, the heterocycles optionally containing further rings fused onto the ring bonded to $CR^1{}_2$.

4. The crosslinkable composition of claim 1, wherein x is 1.

5. The crosslinkable composition of claim 1, prepared from
(A) at least one organosilicon compound having at least two OH groups,
(B) at least one heterocyclic compound of the formula (I),
(C) optionally crosslinking agents other than a compound of the formula (I),
(D) optionally one or more catalysts,
(E) optionally a compound having basic nitrogen,
(F) optionally one or more fillers,
(G) optionally one or more adhesion promoters,
(H) optionally one or more plasticizers, and
(I) optionally, further additives conventionally useful in condensation-crosslinkable compositions.

6. The crosslinkable composition of claim 1, wherein at least one organosilicon compound A) comprises units of the formula $$R^3{}_b(OH)_c SiO_{(4-b-c)/2} \qquad (II)$$

in which
R³ are identical or different and are optionally substituted hydrocarbon radicals optionally interrupted by oxygen atoms,
b is 0, 1, 2 or 3, and
c is 0, 1, 2 or 3,
with the proviso that the sum of b+c is ≦3 and at least two condensable OH radicals are present per molecule.

7. The crosslinkable composition of claim 1 prepared from
(A) at least one organosilicon compound containing units of the formula (II), $$R^3{}_b(OH)_c SiO_{(4-b-c)/2} \qquad (II)$$

in which
R³ are identical or different and are optionally substituted hydrocarbon radicals optionally interrupted by oxygen atoms,
b is 0, 1, 2 or 3 and
c is 0, 1, 2 or 3,
with the proviso that the sum of b+c is ≦3 and at least two condensable OH radicals are present per molecule
(B) at least one compound of the formula (I),
(C) optionally one or more crosslinking agents other than one of the formula (I),
(D) optionally one or more catalysts,
(E) at least one compound having basic nitrogen,
(F) hydrophilic pyrogenic silica,
(G) optionally one or more adhesion promoters,
(H) at least one plasticizer, and
(I) optionally further additives useful in condensation-crosslinkable organosilicon composition.

8. A process for the preparation of the crosslinkable composition of claim 1, comprising mixing all constituents with one another with the substantial exclusion of water.

9. The process of claim 8, wherein in a continuous procedure, first organosilicon compound (A) is continuously mixed with compound(s) (B) and optionally plasticizer (H), and following a reaction time of organosilicon compound (A) with compound(s) (B) of from 1 to 60 minutes, further constituents of the mixture are optionally mixed in.

10. A molding produced by crosslinking a composition of claim 1.

* * * * *